United States Patent [19]

Vargiu et al.

[11] 3,896,080

[45] July 22, 1975

[54] LIQUID HARDENERS FOR LIQUID EPOXY RESINS, MANUFACTURING METHOD AND USE

[75] Inventors: Silvio Vargiu, Sesto S. Giovanni; Renato Berti, Milan; Mario Pitzalis, Arcore, all of Italy

[73] Assignee: Societa' Italiana Resine S.I.R. S.p.A., Milan, Italy

[22] Filed: Sept. 20, 1973

[21] Appl. No.: 399,006

[30] Foreign Application Priority Data
Sept. 20, 1972 Italy.................................. 29429/72

[52] U.S. Cl. ...... 260/47 EN; 252/188.3; 260/18 EP; 260/347.8; 260/540; 260/830
[51] Int. Cl............................................. C08g 30/14
[58] Field of Search.......... 260/47 EN, 2 N, 830, 59

[56] References Cited
UNITED STATES PATENTS
3,268,466  8/1966  Simm................................ 260/47 X
3,763,102  10/1973  Hoffman et al...................... 260/47

Primary Examiner—Morris Liebman
Assistant Examiner—T. Pertilla
Attorney, Agent, or Firm—Sughrue, Rothwell, Mion, Zinn and Macpeak

[57] ABSTRACT

Liquid hardeners for liquid epoxy resins comprising the products of condensation at high temperature of an aromatic polyamine with at least one hydroxy compound selected from the group consisting of polyalkylene glycols, furan alcohols and their polymers and with at least one acidic compound selected from the group consisting of phenols or carboxylic acids. Said liquid hardeners are prepared by heating a mixture of an aromatic polyamine and at least one of the above-mentioned hydroxy compounds for about 60 to 120 minutes to about 90° to 130°C and heating the product obtained with at least one of the above-mentioned acidic compounds for about 1 to 5 hours to about 70° to 170°C.

5 Claims, No Drawings

LIQUID HARDENERS FOR LIQUID EPOXY RESINS, MANUFACTURING METHOD AND USE

The invention relates to new liquid hardeners for liquid epoxy resins, a process for their production, and their use for the curing of liquid epoxy resins.

It is well known that epoxy resins can be transformed into insoluble and infusible macromolecular products with hardeners or cross-linking agents that can react with the reactive groups of the resins. Examples of conventional hardeners for epoxy resins are cyclic carboxylic anhydrides, amines, and Lewis acids or Friedel-Crafts catalysts; cf. Methoden der Organischen Chemie (Houben-Weyl), 4th ed., Vol. XIV/2 (1963), pp. 499 to 532. Amines, particularly aliphatic and aromatic polyamines, epoxide-amine adducts, and reactive polyamines are used at present for the curing of epoxy resins at low temperatures, e.g. room temperature.

Epoxy resins and hardeners must be matched to each other in their reactivity to ensure a certain pot life of the reaction mixture after it has been made up. The mechanical and chemical properties of the cured resins also depend on the nature of the hardener. Epoxy resins cured with aromatic polyamines have better mechanical strength properties and higher chemical stability than the cured products obtained with aliphatic polyamines. On the other hand, as low temperature hardeners for liquid epoxy resins aromatic polyamines have the disadvantage that they are normally solid at room temperature and have a lower reactivity, with the result that the pot life of the reaction mixture is too long.

As hardeners for liquid epoxy resins, aliphatic polyamines have the advantage that they are normally liquid at room temperature and the pot life of the reaction mixtures lies within a desired range. Aliphatic polyamines can therefore be readily homogeneously mixed with liquid epoxy resins and give reactive mixtures having high fluidity.

One object of the invention is to provide liquid hardeners that can be easily and homogenously mixed with liquid epoxy resins and give these reactive mixtures high fluidity and a pot life comparable with that of epoxy resins containing aliphatic polyamines as hardeners, but which give cured products having good mechanical properties and chemical stability such as are found with products prepared with aromatic polyamines as hardeners. This purpose is achieved by the invention.

Thus the invention relates to liquid hardeners for liquid epoxy resins comprising the products of condensation at high temperature of an aromatic polyamine with at least one hydroxy compound selected from the group consisting of polyalkylene glycols, furan alcohols and their polymers and with at least one acidic compound selected from the group consisting of phenols or carboxylic acids, characterized in that they are prepared by reaction of a mixture of an aromatic polyamine containing primary amino groups and at least one hydroxy compound from the group of polyalkylene glycols, furan alcohols, and their polymers for about 60 to 120 minutes, preferably about 90 to 120 minutes, at temperatures of about 90° to 130°C (the ratio of primary amino groups to hydroxyl groups being about 4:1 to 7:1, preferably about 5:1 to 6:1) and reaction of the resulting product with at least one acidic compound from the group of phenols and carboxylic acids for about 1 to 5 hours at temperatures of about 70° to 170°C (the ratio of primary amino groups of the aromatic amine used to phenolic hydroxyl groups and/or carboxyl groups being about 1:1 to 3:1, preferably about 1.5:1 to 2:1).

The invention also relates to a process for the production of the liquid hardeners, characterized in that a. a mixture of an aromatic polyamine containing primary amino groups and at least one hydroxy compound selected from the group consisting of polyalkylene glycols, furan alcohols, and their polymers is heated for about 60 to 120 minutes, preferably about 90 to 120 minutes, to temperatures of about 90° to 130°C, the ratio of primary amino groups to hydroxyl groups being about 4:1 to 7:1, preferably about 5:1 to 6:1, and b. the product obtained in accordance with (a) is heated with at least one acidic compound selected from the group consisting of phenols and carboxylic acids for about 1 to 5 hours to temperatures of about 70° to 170°C, the ratio of primary amino groups of the aromatic polyamine used in (a) to phenolic hydroxyl groups and/or carboxyl groups being about 1:1 to 3:1, preferably about 1.5:1 to 2:1.

The hardeners of the invention can be used for the curing of liquid epoxy resins at temperatures of 20° to 25°C or lower. The mixture of the liquid hardener of the invention and the liquid epoxy resin has a high fluidity and has a pot life within a desired range.

The aromatic polyamines used are preferably compounds having the general formula $X(NH_2)_n$ or $(H_2N)_m X—R—X(NH_2)_m$, where X is an aromatic preferably preferably a phenyl or biphenyl group, R is an alkylene group with 1 to 6 carbon atoms or a sulfone group, preferably a methylene group, $n$ is a whole number having a value of from 2 to 4, and $m$ is a whole number having a value of from 1 to 3. Specific examples of aromatic polyamines used in accordance with the invention are o-, m-, and p-phenylenediamine, p,p'-methylenedianiline, p,p'-diaminodiphenyl sulfone, triaminobenzene, 2,4-diaminotoluene, and 3,3'-diaminobiphenyl.

Specific examples of furan alcohols or their polymers that can be used in the process of the invention are furfuryl alcohol, tetrahydrofurfuryl alcohol, and still curable furfuryl alcohol resins having a molecular weight of about 200 to 3000, which can be prepared by condensation of furfuryl alcohol in the presence of an acid; cf. Methoden der Organischen Chemie (Houben-Weyl), 4th ed., Vol. XIV/2 (1963), pp.633 to 636.

The polyalkylene glycols used in the process of the invention are preferably compounds with a molecular weight of about 150 to 1500. Specific examples of these polyalkylene glycols are polyethylene glycols, polypropylene glycols, and poly(ethylene-propylene) glycols.

The polyethylene glycols have the general formula

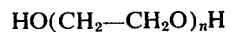

These polyethylene glycols are prepared by addition of ethylene oxide to water, ethylene glycol, or diethylene glycol in the presence of small quantities of sodium hydroxide as a catalyst. The polypropylene glycols have the general formula

These compounds are prepared by addition of propylene oxide to water, propylene glycol, or dipropylene glycol in the presence of sodium hydroxide as a catalyst.

The poly(ethylene-propylene) glycols have the general formula

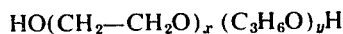

These mixed polyethylene-polypropylene glycols are prepared in the same way as the polyethylene glycols and polypropylene glycols from ethylene oxide and propylene oxide.

The corresponding monoalkyl ethers of the poly(ethylene-propylene) glycols may also be used as polyalkylene glycols in the process of the invention, the alkyl residue preferably being derived from a residue having 1 to about 4 carbon atoms.

Monofunctional or polyfunctional phenols may be used as phenolic compounds in the process of the invention. Specific examples of these phenols are phenol and its derivatives substituted in any position in the benzene ring, such as o-, m-, and p-chlorophenol and o-, m-, and p-nitrophenol.

Aliphatic or aromatic carboxylic acids may be used as carboxylic acids in the process of the invention. Specific examples of these carboxylic acids are formic acid, acetic acid, benzoic acid, and salicylic acid.

It is important in the process of the invention that the ratio of the primary amino groups of the aromatic polyamine used to the hydroxyl groups of the hydroxy compound in step (a) should be about 4:1 to 7:1. Very good results are obtained at a ratio of 5:1 to 6:1.

Step (b) of the process of the invention is carried out for a time of about 1 to 5 hours at a temperature of about 70° to 170°C. In this stage, it is important that the ratio of the primary amino groups of the aromatic polyamine used in step (a) to phenolic hydroxyl groups and/or carboxyl groups should be about 1:1 to 3:1. The best results are obtained when the ratio is 1.5:1 to 2:1.

The process of the invention yields hardeners that are liquid at room temperature and have the following general properties:

| | |
|---|---|
| Appearance: | clear |
| Viscosity at 25°C: | 500 to 5000 cp |
| Gardner colour: | 10 to 18 |
| Density at 25°C: | 1.1 to 1.3 g/cm³ |
| Pot life at 25°C in a mixture with liquid epoxy resin: | 20 minutes to 8 hours. |

The hardeners of the invention have the advantage that they are neither hygroscopic nor toxic. They can cure liquid epoxy resins at room temperature (20° to 25°C) or even lower, e.g. at temperatures down to −5°C. The liquid hardeners of the invention can be easily and homogeneously mixed with the liquid epoxy resins. Reactive, i.e. curable mixtures having high fluidities are obtained. The hardeners of the invention effect thorough cross-linking of the liquid epoxy resins even under unusual conditions, e.g. under water.

For the curing of liquid epoxy resins, the liquid hardeners of the invention are used in quantities of from about 20 to 60 wt.% based on the liquid epoxy resin.

In the present description, liquid epoxy resins are to be understood as condensation products of a halohydrin and a polyfunctional phenol, which are liquid at room temperature and have an epoxy equivalent weight of 110 to 250. Examples of suitable polyfunctional phenols are bisphenol, resorcinol, pyrocatechol, hydroquinone, and methylresorcinol. Epichlorohydrin is preferred as the halohydrin. A particularly useful class of liquid epoxy resins that can be satisfactorily cured with the liquid hardeners of the invention are the reaction products of bisphenol A, i.e. 2,2-bis(4-hydroxyphenyl)propane, with excess epichlorohydrin in the presence of an inorganic base. It is well known that the reaction of bisphenol A with epichlorohydrin in a molar ratio of about 1:10 in the presence of about 2 moles of sodium hydroxide per mole of bisphenol yields epoxy resins having an epoxy equivalent weight of about 180 to 200. These epoxy resins can be mixed with the hardeners of the invention. One obtains compositions that can be cured at low temperatures and that possess the following properties:

| | |
|---|---|
| Pot life: | 20 minutes to 8 hours |
| Viscosity at 25°C: | 2000 to 9000 cp. |

The pot life of the epoxy resins containing hardeners is of the same order of magnitude as that of liquid epoxy resins containing aliphatic polyamines as hardeners.

Finally, curing of the liquid epoxy resins with the hardeners of the invention yields cured products with very good mechanical properties and high chemical resistance.

The invention is further illustrated by the following non-limiting examples.

EXAMPLE 1

520 parts by weight of p,p'-methylenedianiline are introduced into a flask fitted with a stirrer, a reflux condenser, and a thermometer and heated to about 115°C. 110 parts by weight of furfuryl alcohol are added within a period of about 1 hour. The mixture is then heated for a further 30 minutes at about 115°C. 370 parts by weight of phenol are then added within a period of about 10 minutes. The temperature of the mixture is gradually raised to about 170°C within a period of about 2 hours. This temperature is maintained for about 3½ hours. The reaction mixture is then cooled to 50° to 70°C and discharged.

The product has the following properties:

| | |
|---|---|
| Appearance: | clear liquid |
| Viscosity at 25°C: | 1100 cp |
| Gardner colour: | about 18 |
| Density at 25°C: | 1.147 g/cm³ |

55 parts by weight of the hardener obtained are mixed with 100 parts by weight of a liquid epoxy resin. The epoxy resin was prepared by reaction of bisphenol A with excess epichlorohydrin in the presence of an inorganic base. It has the following properties:

| | |
|---|---|
| Epoxy equivalent weight: | 180 to 190 |
| Viscosity at 25°C: | 9000 to 14,000 cp. |

The epoxy resin containing the hardener has the following properties:

Pot life at 25°C: 110 minutes
Time for complete curing
at room temperature: 5 to 7 days

EXAMPLE 2

500 parts by weight of p,p'-methylenedianiline are introduced into a flask fitted with a stirrer, a reflux condenser, and a thermometer and heated to 120°C. 130 parts by weight of tetrahydro-2-furanmethanol are added within a period of about 2 hours. The mixture is then heated for a further 30 minutes at 120°C. 250 parts by weight of phenol and 120 parts by weight of p-chlorophenol are then added within a period of about 10 minutes. The mixture is subsequently heated to about 170°C within 2 hours. The mixture is heated at this temperature for a further 5 hours and then cooled to 50° to 70°C and discharged. The hardener obtained has the following properties:

Appearance: clear liquid
Viscosity at 25°C: 550 cp
Gardener colour: about 18
Density at 25°C: 1.108 g/cm³.

100 parts by weight of the liquid epoxy resin used in Example 1 are mixed with 55 parts by weight of the hardener. A reaction composition having the following properties is obtained:

Pot life at 25°C: 30 minutes
Time for complete curing
at room temperature: 3 to 7 days

EXAMPLE 3

600 parts by weight of m-phenylenediamine are introduced into a flask fitted with a stirrer, a reflux condenser, and a thermometer and heated to 115°C. 150 parts by weight of a furfuryl alcohol resin having a viscosity of about 3000 cp are added within a period of 10 minutes, and the mixture is heated at 115°C for 1 hour. 250 parts by weight of 2,4-dichlorophenol are then added within 5 minutes and the temperature is raised to 150°C within 1 hour. The mixture is heated at this temperature for a further 2½ hours, then cooled to 50 to 70°C and discharged. A hardener having the following properties is obtained:

Appearance: clear liquid
Viscosity at 25°C: 640 cp
Density at 25°C: 1.112 g/cm³

100 parts by weight of the liquid epoxy resin used in Example 1 are mixed with 25 parts by weight of the hardener. The resulting reaction composition has the following properties:

Pot life at 25°C: 25 minutes
Time for Complete curing
at room temperature: 3 to 7 days.

EXAMPLE 4

500 parts by weight of p,p'-methylenedianiline are introduced into a flask fitted with a stirrer, a reflux condenser, and a thermometer and heated to 115°C. 100 parts by weight of furfuryl alcohol are added within a period of 1 hour and the mixture is heated for a further 30 minutes at 115°C. 300 parts by weight of dipropylene glycol are then added within 30 minutes and the mixture is heated for a further 1½ hours at 115°C and then cooled to 70°C. 100 parts by weight of salicylic acid are then added within about 15 minutes. The mixture is heated for a further hour at 70°C and then discharged. The hardener has the following properties:

Appearance: clear liquid
Viscosity at 25°C: 1200 cp
Gardener colour: about 18
Density at 25°C: 1.021 g/cm³

100 parts by weight of the liquid epoxy resin used in Example 1 are mixed with 55 parts by weight of the hardener. The reaction composition has the following properties:

Pot life at 25°C: 50 minutes
Time for complete curing
at room temperature: 3 to 7 days.

Table 1 shows the properties of the cured products from the reaction compositions prepared in accordance with Examples 1 to 4. The samples were cured for 24 hours at room temperature and 6 hours at 90°C.

Table 1.

| Properties | Test standard | 1 | 2 | Examples 3 | 4 |
|---|---|---|---|---|---|
| Tensile strength kg/cm² | UNI 4280 | 581 | 586 | 590 | 508 |
| Flexural strength kg/cm² | UNI 4274 | 1136 | 1100 | 880 | 1126 |
| Flexural modulus kg/cm² | UNI 4275 | $34.5 \cdot 10^3$ | $28.7 \cdot 10^3$ | $26.8 \cdot 10^3$ | $29.3 \cdot 10^3$ |
| Heat distortion temperature,°C | DIN 53462 | 66 | 65 | 60 | 57,5 |
| Water absorption, wt.% | ASTM D-570 | 0.21 | 0.19 | 0.21 | 0.32 |
| Shore D hardness | DIN 53505 | 84 | 84 | 82 | 83 |

What we claim is:

1. Liquid compositions curable at temperatures of from room temperature down to −5°C., comprising a liquid 1,2-epoxy resin, which can be synthesized from the reaction of a halohydrin and a polyfunctional phenol, and about 20–60 weight percent, based on the liquid 1,2-epoxy resin, of a liquid hardener comprising the reaction product at high temperature of:
   a. an aromatic polyamine,
   b. at least one hydroxy compound selected from the group consisting of:
      polyalkylene glycols, furan alcohols and their polymers selected from the group consisting of furfuryl alcohol, tetrahydrofurfuryl alcohol or a still curable furfuryl alcohol resin with a molecular weight of about 200 to 300, and c. at least one acidic compound selected from the group consisting of:

phenols selected from the group consisting of phenol, o-chlorophenol, m-chlorophenol, p-chlorophenol, 2,4-dichlorophenol, o-nitrophenol, m-nitrophenol, and p-nitrophenol, and carboxylic acids selected from the group consisting of formic, acetic, benzoic and salicyclic acid, said hardener being formed under the following reaction conditions:

the aromatic polyamine (A) and the hydroxyl compound (B) are heated together for about 60 to 120 minutes to temperatures of about 90 to 130°C., the ratio of primary amino groups to hydroxyl groups being about 4:1 to 7:1, and the product from the preceding reaction is heated with the acidic compound (c) for about 1 to 5 hours to temperatures of about 70° to 170°C, the ratio of the aromatic polyamine used to phenolic hydroxyl groups being about 1:1 to 3:1.

2. Liquid compositions in accordance with claim 1, characterized in that the aromatic polyamine is a compound having the general formula $$X(NH_2)_n \text{ or } (H_2N)_m X—R—X(NH_2)_m$$

wherein X is an aromatic residue, R is an alkylene group with 1 to 6 carbon atoms or a sulfone group, $n$ is a whole number with a value of 2 to 4, and $m$ is a whole number with a value of 1 to 3.

3. Liquid compositions in accordance with claim 2, characterized in that X is a phenyl or biphenyl group and R is a methylene group.

4. Liquid compositions in accordance with claim 1, characterized in that the polyalkylene glycol is a polyethylene glycol, a polypropylene glycol or a poly(ethylene-propylene) glycol with a molecular weight of about 150 to 1500.

5. Liquid compositions in accordance with claim 1, characterized in that the polyalkylene glycol is a monoalkyl ether of a poly(ethylene-propylene) glycol with a molecular weight of about 150 to 1500 and containing 1 to 4 carbon atoms in the alkyl group of the alkyl ether part.

* * * * *